United States Patent [19]

Thorton-Trump

[11] 4,073,437
[45] Feb. 14, 1978

[54] CONVERSION PACKAGE FOR AIRCRAFT DE-ICING MACHINES

[76] Inventor: Walter Edmond Thorton-Trump, 108 Beaver Lake, Plattsmouth, Nebr. 68048

[21] Appl. No.: 695,081

[22] Filed: June 11, 1976

[51] Int. Cl.² .............................................. B60S 3/00
[52] U.S. Cl. .................................. 239/131; 239/165; 239/172; 239/304
[58] Field of Search ............... 239/130, 131, 165, 172, 239/304, 310, 127; 169/24; 182/51; 280/5 C, 5 D, 5 E; 137/335, 344, 565

[56] References Cited

U.S. PATENT DOCUMENTS

| | | | |
|---|---|---|---|
| 3,086,713 | 4/1963 | Moldenhauer | 239/130 X |
| 3,243,123 | 3/1966 | Inghram et al. | 239/165 X |
| 3,485,176 | 12/1969 | Telford et al. | 239/135 X |

*Primary Examiner*—Evon C. Blunk
*Assistant Examiner*—Andres Kashnikow
*Attorney, Agent, or Firm*—Fitch, Even, Tabin & Luedeka

[57] ABSTRACT

A conversion unit for an aircraft de-icing machine which permits the machine to be easily converted to a much improved device without the necessity of completely remanufacturing the machine. The conversion unit comprises a frame which is secured to the rearward end of the de-icing machine frame. A housing is secured to the conversion unit frame and encloses the conversion unit components. A water heater is provided in the housing for heating the water being supplied thereto. A "glycol" pump is also provided on the conversion unit frame and is in fluid communication with the detergent tank on the de-icing machine which is used to contain "glycol" rather than detergent. The water heater is fluidly connected to the water pump on the de-icing machine and is fluidly connected to the spray nozzle on the aerial platform provided on the de-icing machine. A "glycol" proportioning valve is also provided adjacent the spray nozzle and is in fluid communication therewith. The "glycol" pump is operatively connected to the proportioning valve so that the "glycol" may be selectively proportioned into the heated water being sprayed on the aircraft.

10 Claims, 7 Drawing Figures

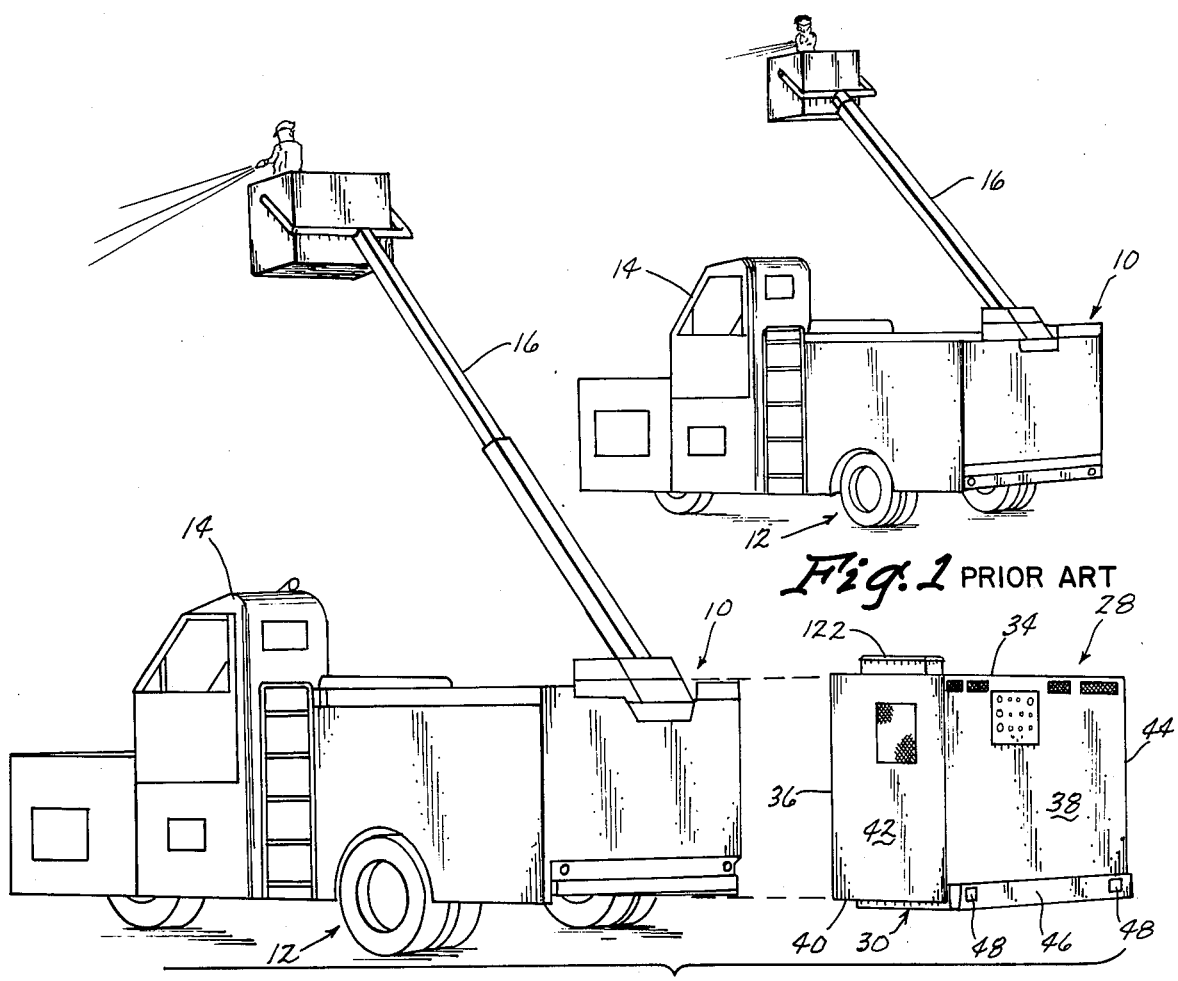

CONVERSION PACKAGE FOR AIRCRAFT DE-ICING MACHINES

BACKGROUND OF THE INVENTION

This invention relates to an aircraft de-icing machine and more particularly to a conversion unit which may be secured to the rearward end of the machine to permit the "glycol" to be proportionatey mixed with heated water being sprayed onto the aircraft.

Aircraft de-icing machines ordinarily include a truck having an aerial platform mounted thereon. The conventional machine ordinarily includes water and detergent tanks mounted thereon together with a water pump connected thereto to enable a water and detergent mixture to be sprayed onto the aircraft in summer months. During periods of icing, de-icing fluid such as a 50—40 mixture of prophylene glycol, etc. ("glycol") and water is poured into the water tank so that a prophylene glycol-water mixture may be sprayed onto the aircraft from the aerial platform to melt ice and snow on the aircraft and to provide a thin film of de-icing fluid thereon for preventing further icing.

The conventional de-icing machines ordinarily include a small open flame water heater which heats the mixture but it has been previously necessary to spray a 50—50% mixture of glycol-water onto the aircraft to achieve the desired results. The tremendous expense of the de-icing fluid makes such a mixture uneconomical and impractical. A further problem connected with the 50—50% mixture is its effect on the environment. The mixture normally flows from the aircraft and is flushed down a sewer drain or the like. Thus, the disposal of the waste solution is extremely difficult.

Therefore, it is a principal object of the invention to provide an apparatus which enables scalding hot water to be sprayed onto the aircraft wherein the "glycol" percentage is nil under many conditions.

A still further object of the invention is to provide a conversion unit which may be secured to conventional aircraft de-icer machines to enable the machine to de-ice the aircraft with no "glycol" being required but capable of applying a variable mixture of "glycol" and water for residual protection.

A still further object of the invention is to provide a conversion unit for aircraft de-icing machines wherein the machines may be converted to an improved machine without sending the machines back to the factory for remanufacturing.

A still further object of the invention is to provide a conversion unit for aircraft de-icer machines wherein the unit may be installed on the machine in the field by untrained personnel.

A still further object of the invention is to provide a conversion unit for aircraft de-icer machines which is economical to manufacture, durable in use and refined in appearance.

BRIEF DESCRIPTION OF THE DRAWINGS

FIG. 1 is a perspective view of a conventional aircraft de-icing machine:

FIG. 2 is an exploded perspective view illustrating the conversion unit of this invention and the conventional aircraft de-icing machine:

FIG. 3 is a rear perspective view of the conversion unit with portions thereof cut away to more fully illustrate the invention:

FIG. 4 is a rear view of the conversion unit:

DESCRIPTION OF THE PREFERRED EMBODIMENT

Figure 5:
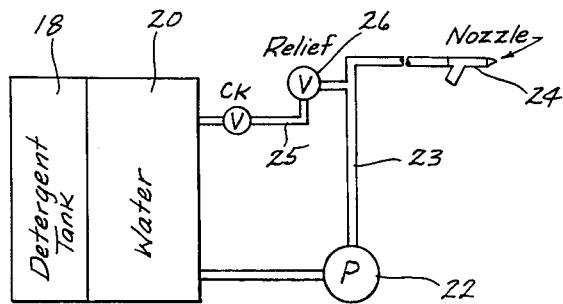
FIg. 5 is a simplified schematic illustrating the means by which water is sprayed onto the aircraft by conventional machines.

The numeral 10 refers generally to a conventional aircraft de-icing machine or "de-icer" designed to spray a mixture of de-icing fluid-water or detergent-water onto an airplane (not shown). Machine 10 generally includes a wheeled frame means 12 having a cab 14 provided on the forward end thereof. Machine 10 also includes an aerial platform 16 pivotally mounted thereon designed to permit the operator to position himself adjacent the aircraft. The conventional machines of the type illustrated in FIG. 1 normally include a detergent tank 18 and a water tank 20 as illustrated in the simplified schematic of FIG. 5. Machine 10 also includes a water pump 22 adapted to pump water from water tank 20 through line 23 to a nozzle referred to generally by the reference numeral 24. A relief valve 26 is also normally provided as indicated in FIG. 5 to return the water to the tank 20 by line 25 as required. During the summer months, de-icing fluid is not mixed with the water but the detergent in the detergent tank 18 may be added to the water so that a water-detergent solution may be sprayed onto the aircraft. During the winter months, de-icing fluid such as prophylene glycol, etc. would normally be poured or dumped into the water tank 20 in the desired mixture. Heretofore, this mixture was normally in the range of fifty percent water and fifty percent de-icing fluid. The 50—50 mixture is sprayed onto the aircraft to remove the ice therefrom and to provide a thin layer of the mixture thereon to prevent further icing. It is to the apparatus of FIGS. 1 and 5 that the instant invention is mounted to enable the existing apparatus 10 to be used to spray a scalding water and de-icing fluid solution onto the aircraft wherein the proportion of de-icing fluid is much less than heretofore possible due to the scalding action of the water.

The conversion package or unit of this invention is referred to generally by the reference numeral 28 and is designed so as to be easily mounted at the rearward end of the machine 10 without the necessity of returning the machine to the factory for remanufacturing. Unit 28 generally includes a supporting frame 30 which may be connected to the frame of the machine 10 by bolting, welding, etc. The unit 28 includes a housing 32 mounted on the frame 30 which is provided with the necessary access panels to provide access to the interior thereof. For purposes of description, housing 30 will be described as comprising a top 34, front 36, rear 38, bottom 40 and opposite sides 42 and 44. A bumper 46 is secured to the supporting frame 30 at the lower rearward end of the housing 32 and is provided with conventional tail lights, clearance lights, etc. referred to generally by the reference numeral 48.

Figure 7:
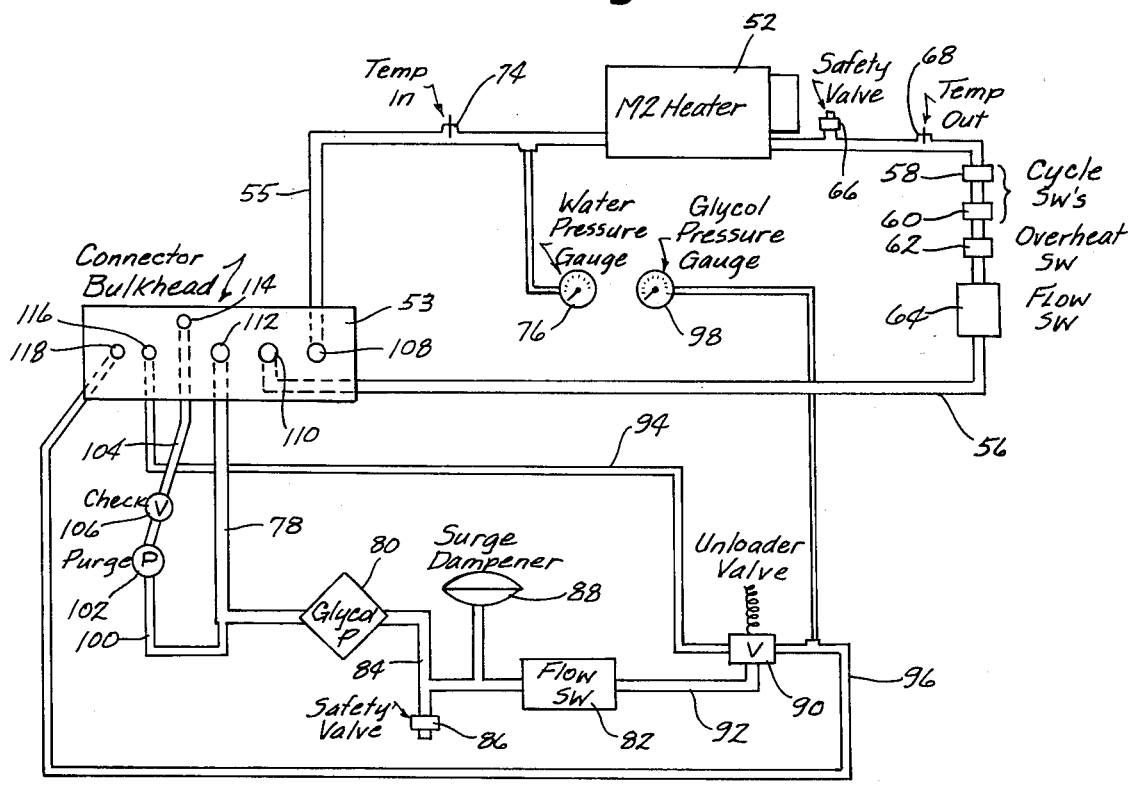
FIG. 7 is a further schematic of the spray circuitry.

A fuel tank 50 is mounted within housing 32 for supplying fuel to the M2 heater 52. The numeral 53 refers to a connector bulkhead located at the lower portion of front 36 of housing 32. Water flows from the connector bulkhead 53 to the heater 52 by means of pipe 55. Pipe 56 extends from heater 52 to bulkhead 53. Cycle switches 58 and 60 are provided in pipe 56 as is an overheat switch 62. Flow switch 64 is also provided in pipe 56. The numeral 66 designates a safety valve in communication with pipe 56 as seen in FIG. 7. The numeral 68 refers to a temperature sensing apparatus for sensing the temperature of the water leaving heater 52. The numeral 74 refers to a temperature sensing mechanism provided in the pipe 55 for sensing the temperature of the water entering heater 52. Water pressure gauge 76 is operatively connected to pipe 55 in the manner seen in FIG. 7. Pipe 78 extends from bulkhead 53 to a de-icer fluid pump 80 which is connected to a flow switch 82 by pipe 84. The numerals 86 and 88 refer to a safety valve and surge dampener operatively connected to the pipe 84. Flow switch 82 is connected to an unloader valve 90 by pipe 92. Unloader valve 90 is connected to the bulkhead 53 by pipe 94. Pipe 96 extends from unloader valve 90 to the bulkhead 53. De-icer fluid pressure gauge 98 is in communication with the pipe 96 as seen in FIG. 5. Pipe 100 is connected to pipe 78 and extends therefrom to a purge pump 102 connected to bulkhead 53 by pipe 104 which has a check valve 106 imposed therein. For purposes of description, bulkhead 53 is provided with connectors 108, 110, 112, 114, 116 and 118 which are connectors to pipes 55, 56, 78, 104, 94 and 96 respectively.

The conversion package 28 also includes an engine 120 adapted to supply air to the heater in conventional fashion. Package 10 further includes an exhaust stack 122 for exhausting the gases of combustion from the heater 52. Engine 120 drives a 110 volt alternator 124 in conventional fashion.

In converting the existing de-icer 10 to accomodate the package 28, lines or pipes 126 and 128 are connected to the detergent tank 18 which becomes a de-icing fluid tank. Pipes 126 and 128 are extended to the rear of the de-icer 10 and would have suitable connectors at the rearward ends thereof adapted to be connected to the connectors 116 and 112 at bulkhead 53 respectively.

Figure 6:
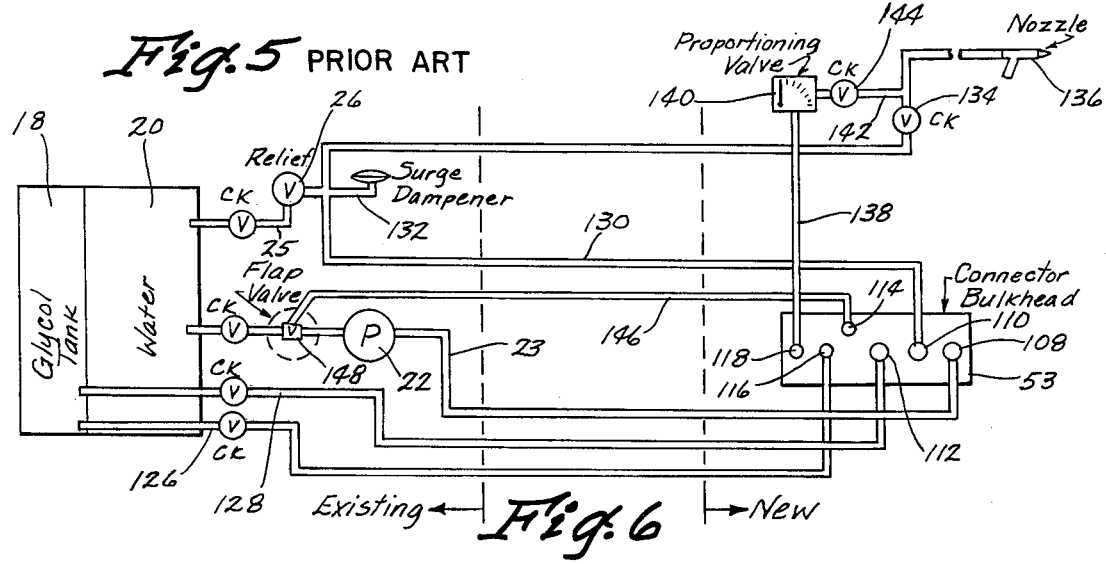
FIG. 6 is a schematic of a portion of the spray circuitry of this invention.

In modifying de-icer 10, line 23 is extended to the rearward end thereof and connected to the connector 108. Line 130 is extended from connector 110 to nozzle 136 as seen in FIG. 6. Surge dampener 132 and check valve 134 are operatively connected to line 130 as also seen in FIG. 7. Line or pipe 138 extends from connector 118 to proportioning valve 140 which is connected to line 130 by pipe 142 which has a check valve 144 provided therein. Line 146 extends from connector 114 to a flap valve 148 as seen in FIG. 7.

Thus, when it is deemed advisable to convert the existing de-icer 10 to a more efficient machine, the conversion unit 28 is bolted or welded to the rearward end of the de-icer 10. The necessary connections would be made at the bulkheads as previously described. The detergent tank becomes a "glycol" tank and would be filled with "glycol". When it is desired to de-ice aircraft, the de-icer engine is actuated so that pump 22 would be activated. Heater 52 and motor 120 are also activated so that water being supplied to the heater 52 will be heated to the desired temperature.

When the water has reached the desired temperature, the aerial platform 16 would be maneuvered so as to be positioned adjacent the aircraft. The operator then would actuate the pump 22 so that water under pressure is supplied to the nozzle 136 through the circuitry illustrated in FIGS. 6 and 7. The operator would spray the "scalding" water onto the aircraft to melt the snow and ice therefrom. If necessary, the operator would then spray a film of water-glycol onto the aircraft to prevent further icing. Proportioning valve 140 permits the operator to precisely control the amount of "glycol" being supplied to the water. Thus, the operator can proportion the amount of "glycol" being added to the heated water so that de-icing fluid may be conserved. Thus, much less de-icing fluid is required due to the heater 52 heating the water to an extremely high temperature so that a "scalding " affect is achieved. It has been found that the conversion package disclosed herein enables existing de-icers to be converted to a more efficient machine for about one-third of the cost of fabricating an entirely new machine.

Unit 10 is provided with several sophisticated safety features and equipment. Unit 10 is also provided with a control panel CP including an ignition switch (not shown) to provide energy to activate the starter switch for the unit. The unit starter will not operate if the vacuum switch (not shown) is open. The engine 120 will not start unless a low oil pressure override switch is manually activated until sufficient oil pressure is obtained. Flow through switches 64 and 82 is needed before high throttle (engine 120) can be attained, therefore, a high throttle override switch is provided until flow switch 82 closes. Flow switch 64 is closed by pressure from water pump 22.

The heater switch (not shown) will activate heater 52 only after a high throttle switch actuates a solenoid to pull the throttle rod, the overheat switch 62 is cold and air is being blown to air switch 200. With conditions thus satisfied, the 110 volt relay switch is automatically closed thereby sending energy to the ignition transformer 202 which sends a spark to the electrodes inside the heater 52 to ignite the fuel which has been pumped through two stages of solenoids. The solenoids are controlled by cycle switches 58 and 60. Lights also indicate which stages are in use. The 110 volt fuel pump 204 will not operate until a 110 volt relay switch is closed. Lights indicate if there is flame and air through ultraviolet sensors. Additional lights are also used to indicate if heater flow, glycol flow, engine oil pressure, engine temperature and fuel pressure is good or bad.

When spark is attained, ultraviolet sensors "see" ultraviolet rays and send signals to relays which amplify the signal and close points thereby activating solenoids which start fuel injection. The second ultraviolet sensor senses flame and shuts unit down if flame is not present. Other gauges on the control panel CP are two hour meters for engine and heater time. A fuel gauge indicates amount of fuel in tank 50 and two gauges monitor the 110 volt system, a volt meter and a frequency meter.

When storm is over, purge pump switch (not shown) at nozzle activates purge pump 102 which pumps "glycol" through lines 114 through all the water lines and components pump 22, heater 52 and nozzle 136 to prevent freezing between storms.

Thus it can be seen that a novel conversion package for aircraft de-icing machines has been provided which achieves all of its stated objectives.

I claim:

1. A conversion unit for an aircraft deicing apparatus of the type having a wheeled frame means with forward and rearward ends, an aerial platform means on said frame means, a first tank on said frame means, a second tank on said frame means, first pump means fluidly connected to said first tank and a nozzle on said aerial platform means, whereby fluid under pressure can be sprayed onto the aircraft, said conversion unit comprising:

conversion unit frame means for attachment to the rearward end of the wheeled frame means;

heater means on said conversion frame means, said heater means being in fluid communication with said first tank and first pump means;

first conduit means communicating said first tank with said heater means, said first pump means and said nozzle;

second pump means for pumping fluid from said second tank;

proportioning valve means communicating said second pump means with said nozzle, said proportioning valve means being adapted to vary the amount of fluid from said second tank that is sprayed from said nozzle with the fluid from said first tank;

second conduit means communicating said second tank with said second pump means, said proportioning valve and said nozzle; and, purging means associated with said second conduit means and said first conduit means for selectively circulating fluid from said second tank throughout said first conduit means, said purging means introducing said fluid into said first conduit means at a location intermediate said first pump means and said first tank.

2. The conversion unit of claim 1 wherein said conversion unit frame means has a rearward end and a bumper means provided on the rearward end of said conversion unit frame means.

3. The conversion unit of claim 2 wherein clearance and signal lights are provided on said bumper means.

4. The conversion unit of claim 1 wherein a conversion unit housing is mounted on the conversion unit frame means for containing the components of the conversion unit.

5. The conversion unit of claim 4 wherein a power means and a blower means are provided in said housing for supplying air to said heater.

6. The conversion unit of claim 5 wherein said housing means has a connector bulkhead at its forward end for operatively connecting the water heater to said water tank and for operatively connecting the de-icing fluid pump to said second tank.

7. A conversion unit for an aircraft deicing apparatus of the type for a wheeled frame means with forward and rearward ends, an aerial platform means on said frame means, a first tank on said frame means, a deicing fluid tank on said frame means, a first pump fluidly connected to said first tank and a nozzle on said aerial platform means whereby fluid under pressure can be sprayed onto the aircraft to be deiced, said conversion unit comprising:

first conduit means communicating said first tank, said first pump, a heater means and said nozzle;

second conduit means communicating said deicing fluid tank, a deicing fluid pump and a proportioning valve, said second conduit merging with said first conduit means upstream of said nozzle;

a heater located in said first conduit means for heating the fluid passing therethrough;

a proportioning valve in said second conduit means for varying the amount of deicing fluid that passes therethrough to said first conduit means for spraying from said nozzle;

a deicing fluid pump located in said second conduit means for pumping deicing fluid from said deicing fluid tank through said proportioning valve to said nozzle; and, purging means associated with said second conduit means for selectively introducing deicing fluid into said first conduit means upstream of said first pump, said purging means preferably being operated subsequently of aircraft deicing to maintain deicing fluid in said first conduit means and first pump during nonuse of said apparatus.

8. A conversion unit as defined in claim 7 wherein said purging means includes one directional valve means on said first conduit means for introducing said deicing fluid therein.

9. A conversion unit as defined in claim 8 wherein said purging means further includes third conduit means interconnected said second conduit means with said one directional valve means.

10. A conversion unit as defined in claim 9 wherein said purging means further includes a purging pump in said third conduit means for pumping said deicing fluids onto said first conduit means.

* * * * *

UNITED STATES PATENT AND TRADEMARK OFFICE
CERTIFICATE OF CORRECTION

PATENT NO. : 4,073,437
DATED : February 14, 1978
INVENTOR(S) : Walter E. Thornton-Trump It is certified that error appears in the above-identified patent and that said Letters Patent are hereby corrected as shown below:

Column 1, line 9, change "proportionatey" to --proportionately--.

Column 1, line 18, change "50-40" to --50-50--.

Column 1, line 27, change "50-50%" to --50%-50%--.

Column 1, line 31, change "50-50%" to --50%-50%--.

Signed and Sealed this

Twenty-sixth Day of September 1978

[SEAL]

Attest:

RUTH C. MASON
Attesting Officer

DONALD W. BANNER
Commissioner of Patents and Trademarks